US011747295B2

United States Patent
Mutnury et al.

(10) Patent No.: US 11,747,295 B2
(45) Date of Patent: Sep. 5, 2023

(54) SYSTEM AND METHOD OF DETERMINING HUMIDITY LEVELS WITHIN INFORMATION HANDLING SYSTEMS

(71) Applicant: Dell Products L.P., Round Rock, TX (US)

(72) Inventors: Bhyrav Mutnury, Austin, TX (US); Umesh Chandra, Santa Cruz, CA (US)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 17/451,266

(22) Filed: Oct. 18, 2021

(65) Prior Publication Data

US 2023/0119282 A1   Apr. 20, 2023

(51) Int. Cl.
*G01N 27/22* (2006.01)
*G06F 11/30* (2006.01)
*G08B 21/18* (2006.01)

(52) U.S. Cl.
CPC ......... *G01N 27/223* (2013.01); *G01N 27/221* (2013.01); *G06F 11/3024* (2013.01); *G06F 11/3058* (2013.01); *G08B 21/182* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,103,910 | B1* | 10/2018 | Chandra | H04L 1/0072 |
| 2016/0205817 | A1* | 7/2016 | Tajima | H05K 1/0216 |
| | | | | 29/17.3 |
| 2019/0297721 | A1* | 9/2019 | Chandra | H05K 1/0216 |
| 2020/0060020 | A1* | 2/2020 | Park | G06F 1/1616 |
| 2020/0284745 | A1* | 9/2020 | Rauwolf | G01N 27/223 |

OTHER PUBLICATIONS

Peterson, Zachariah. "All About PCB Loss Tangent: What it means and when it matters", https://resources.altium.com/p/all-about-pcb-loss-tangent-what-it-means-and-when-it-matters, Nov. 6, 2020.

* cited by examiner

*Primary Examiner* — Alvaro E Fortich
(74) *Attorney, Agent, or Firm* — McDermott Will & Emery LLP

(57) ABSTRACT

In one or more embodiments, one or more systems, one or more methods, and/or one or more processes may measure at least one of a first height value and a first width value of a first eye diagram of a first signal; measure at least one of a second height value and a second width value of a second eye diagram of a second signal; determine at least one of a height difference value and a width difference value respectively between the at least one of the first height value and the first width value of the first eye diagram and the at least one of the second height value and the second width value of the second eye diagram; and determine that the at least one of the height difference value and the width difference value respectively meets or exceeds a height threshold value or a width threshold value.

19 Claims, 8 Drawing Sheets

SYSTEM AND METHOD OF DETERMINING HUMIDITY LEVELS WITHIN INFORMATION HANDLING SYSTEMS

BACKGROUND

Field of the Disclosure

This disclosure relates generally to information handling systems and more particularly to determining humidity levels within information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, by a receiver of a component of an information handling system, a first signal from a trace of a printed circuit board of the information handling system; may measure, by the receiver, at least one of a first height value and a first width value of a first eye diagram associated with the first signal; may, after an amount of time transpires, receive, by the receiver, a second signal from the trace of the printed circuit board; may measure, by the receiver, at least one of a second height value and a second width value of a second eye diagram associated with the second signal; may determine at least one of a height difference value and a width difference value respectively between the at least one of the first height value and the first width value of the first eye diagram and the at least one of the second height value and the second width value of the second eye diagram; may determine that the at least one of the height difference value and the width difference value respectively meets or exceeds at least one of a height threshold value and a width threshold value; and may provide information indicating that a humidity value within the information handling system meets or exceeds a threshold humidity value. In one or more embodiments, providing the information indicating that the humidity value within the information handling system meets or exceeds the threshold humidity value may be performed in response to determining that the at least one of the height difference value and the width difference value respectively meets or exceeds the at least one of the height threshold value and the width threshold value.

In one or more embodiments, the amount of time may be at least one day. In one or more embodiments, the receiver may determine the at least one of the height difference value and the width difference value respectively between the at least one of the first height value and the first width value of the first eye diagram and the at least one of the second height value and the second width value of the second eye diagram. In one or more embodiments, the one or more systems, the one or more methods, and/or the one or more processes may further transmit, by a transmitter of the component, the first signal to the trace of the printed circuit board. For example, the one or more systems, the one or more methods, and/or the one or more processes may further transmit, by the transmitter, the second signal to the trace of the printed circuit board. In one or more embodiments, providing the information indicating that the humidity value within the information handling system meets or exceeds the threshold humidity value may include providing an alert to an administrator that the humidity value within the information handling system meets or exceeds the threshold humidity value. In one or more embodiments, receiving the first signal from the trace of the printed circuit board may include receiving, by the receiver, the first signal from the trace of the printed circuit board from another component of the information handling system, different from the component. For example, receiving the second signal from the trace of the printed circuit board may include receiving, by the receiver, the second signal from the trace of the printed circuit board from the other component of the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
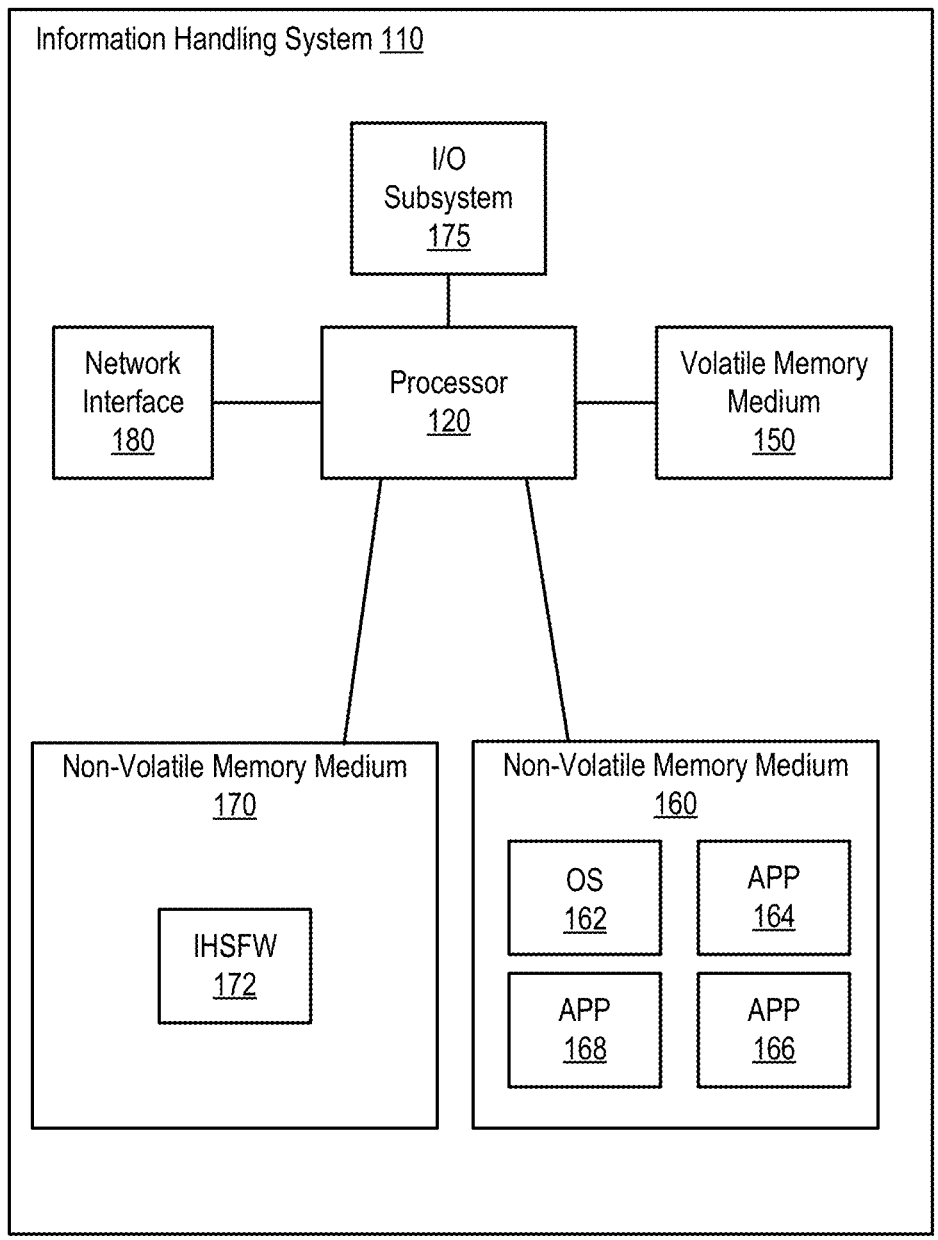
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, temperature and humidity may impact electrical connections in information handling systems. While a datacenter may be environmentally controlled to maintain low humidity and nominal air temperatures, in wet and/or cold climates, where outside air humidity may be high, it may be difficult to maintain humidity of the datacenter within a range of humidity values. For example, when a humidity threshold value is met or exceeded, gaseous water in air may to impact electrical connections within one or more information handling systems. In one or more embodiments, humidity impact may result in solder wire connections corroding and/or breaking. For example, corrosion and/or failure of soldered connections may impact a life of a high-speed network switch and/or a server, which may utilize high clock speeds. In one or more embodiments, humidity impact may result in conductor connections corroding. For example, conductor connections may include two conductors in physical contact in a socket or a plug, among others. For instance, corrosion of conductor connections may impact a life of a high-speed network switch and/or a server, which may utilize high clock speeds. In one or more embodiments, proactively detecting humidity and providing one or more alerts when a humidity threshold value is met or exceeded may prevent failures of computing equipment (e.g., network switches, information handling systems, storage devices, storage systems, etc.).

In one or more embodiments, dielectric properties of a medium of a printed circuit board (PCB) may change with humidity. In one example, a dielectric property of a medium of a PCB may be measured. For instance, when a measurement of the dielectric property of the medium of the PCB meets or exceeds a threshold value, it may be determined that a humidity threshold value is met or exceeded. In another example, a measurement that is associated with a dielectric property of a medium of a PCB may be measured. For instance, when the measurement associated with the dielectric property of the medium of the PCB meets or exceeds a threshold value, it may be determined that a humidity threshold value is met or exceeded.

In one or more embodiments, a relative permittivity ($\varepsilon_r$) of a PCB may increase as humidity increases. For example, the PCB may absorb water molecules (i.e., $H_2O$ molecules) from air that surrounds the PCB. For instance, the PCB may absorb more water molecules (i.e., $H_2O$ molecules) when air that surrounds the PCB becomes more humid, which may increase the relative permittivity of the PCB. In one or more embodiments, relative permittivity of a PCB may be associated with humidity of air surrounding the PCB. For example, a function $\varepsilon_r(h)$ of relative permittivity of a PCB to humidity may be determined. In one or more embodiments, a relative permittivity ($\varepsilon_r$) of a PCB may based on one or more of a transmission line frequency (e.g., a PCB trace frequency), a temperature of air surrounding the PCB, and a humidity of air surrounding the PCB. For example, a function $\varepsilon_r(f, t, h)$ of relative permittivity of a PCB to transmission line frequency (f), temperature of air surrounding the PCB (t), and humidity of air surrounding the PCB (h) may be determined.

In one or more embodiments, an increase in humidity of air that surrounds a PCB may be determined with two or more measurements of the relative permittivity of the PCB. For example, a first measurement associated with the relative permittivity of the PCB may be performed. For instance, a second measurement associated with the relative permittivity of the PCB may be performed and may be based at least on the relative permittivity of the PCB increasing as humidity increases. In one or more embodiments, the second measurement associated with the relative permittivity of the PCB that be performed and that be based at least on the relative permittivity of the PCB may include a measurement of signal degradation. In one or more embodiments, measuring multiple eye diagrams of multiple signals may be performed, which may indicate one or more signal degradations. For example, as humidity of air surrounding the PCB increases, one or more signal degradations may occur. For instance, measurements of one or more eye diagrams of respectively associated one or more signals may respectively indicate one or more signal degradations, which may indicate respective one or more humidity levels.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 2A:
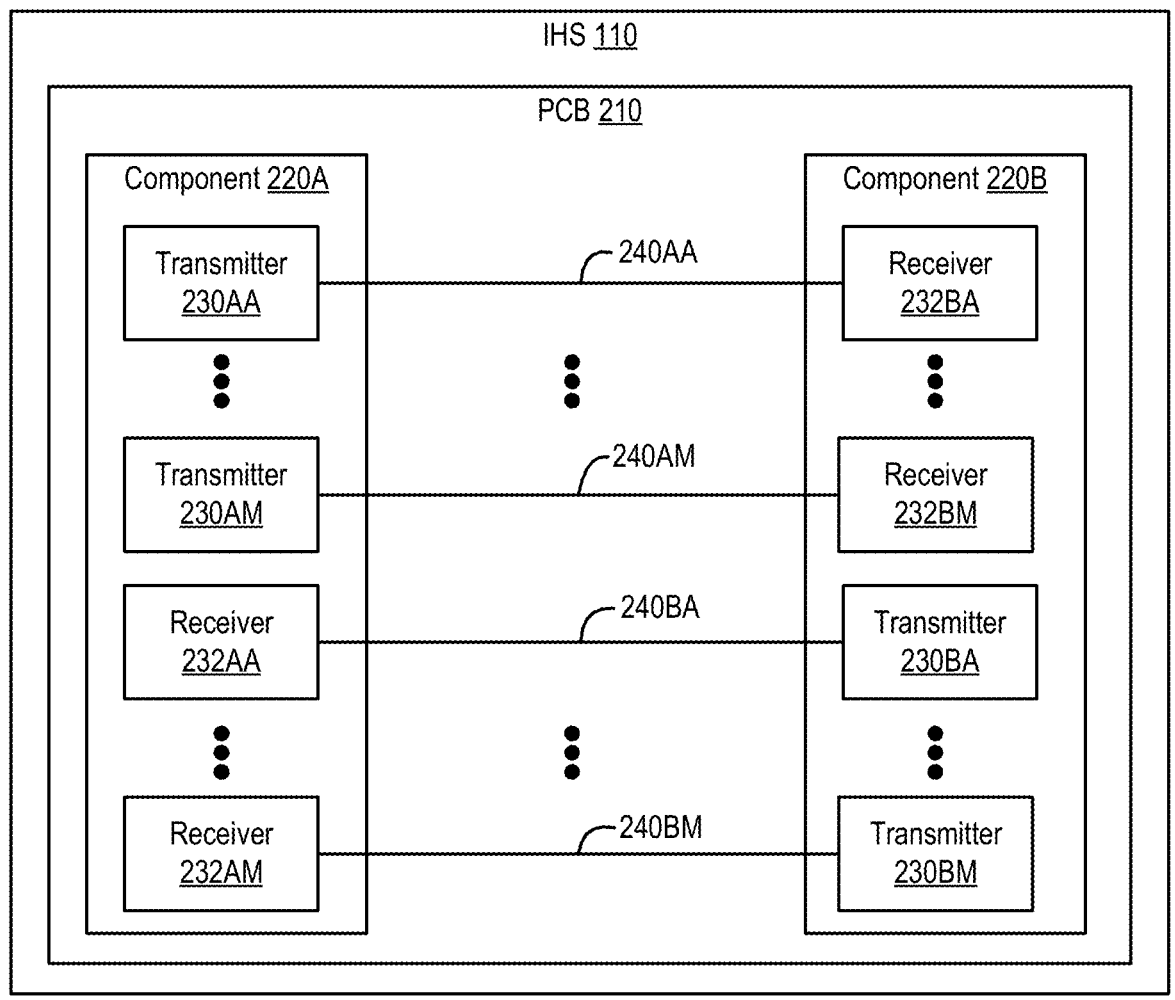
FIG. 2A illustrates an example of an information handling system that includes a printed circuit board, according to one or more embodiments.

Turning now to FIG. 2A, an example of an information handling system that includes a printed circuit board is illustrated, according to one or more embodiments. In one or more embodiments, an information handling system may include a printed circuit board. For example, IHS 110 may include a PCB 210. In one or more embodiments, one or more components 220 of IHS 110 may be mounted to a PCB 210. For example, a component 220 of IHS 110 may include processor 120, volatile memory medium 150, non-volatile memory medium 160, non-volatile memory medium 170, I/O subsystem 175, network interface 180, an embedded controller, a baseboard management controller, a PCIe root complex, a PCIe switch, an I/O controller hub, or a platform controller hub, among others. In one instance, a component of IHS 110 may be mounted to PCB 210 via soldering the component to PCB 210. In another instance, another component of IHS 110 may be mounted to PCB 210 via securing the component to PCB 210 with a socket or a plug. As an example, the socket or the plug may be soldered to PCB 210. In one or more embodiments, two components 220 of IHS 110 may be communicatively coupled to each other via traces 240 of PCB 210. For example, a trace 240 may include a transmission line. In one instance, a transmission line may transmit one or more signals from a first component of IHS 110 to a second component of IHS 110. In another instance, a transmission line may transmit one or more signals from a component of IHS 110 to the component of IHS 110 (e.g., transmitting one or more signals to itself).

In one or more embodiments, a component 220 may include one or more transmitters 230. For example, a transmitter 230 may transmit one or more signals to one or more traces 240 of PCB 210. In one or more embodiments, a transmitter 230 may be configured to implement at least a portion of one or more systems, at least a portion of one or more flowcharts, at least a portion of one or more methods, and/or at least a portion of one or more processes described herein. In one or more embodiments, a component 220 may include one or more receivers 232. For example, a receive 232 may receive one or more signals from one or more traces 240 of PCB 210. For instance, the one or more signals from one or more traces 240 of PCB 210 may include one or more USB signals, one or more PCI signals, one or more PCIe signals, one or more Ethernet signals, one or more I$^2$C signals, one or more SPI signals, one or more InfiniBand signals, one or more high-definition multimedia interface (HDMI) signals, one or more SATA signals, one or more small computer system interface (SCSI) signals, one or more HyperTransport signals, one or more Thunderbolt signals, and/or one or more SMBus signals, among others. In one or more embodiments, a receiver 232 may be configured to implement at least a portion of one or more systems, at least a portion of one or more flowcharts, at least a portion of one or more methods, and/or at least a portion of one or more processes described herein.

In one or more embodiments, components 220A and 220B may be mounted to PCB 210. In one example, component 220A may be soldered to PCB 210. In a second example, component 220B may be soldered to PCB 210. In a third example, component 220A may be mounted to PCB 210 via a socket or a plug. In another example, component 220B may be mounted to PCB 210 via a socket or a plug. As shown, component 220A may include transmitters 230AA-230AM. For example, transmitters 230AA-230AM may be coupled to traces 240AA-240AM, respectively. For instance, transmitters 230AA-230AM may be soldered to traces 240AA-240AM, respectively. As illustrated, component 220B may include receivers 232BA-230BM. For example, receivers 232BA-230BM may be coupled to traces 240AA-240AM, respectively. For instance, receivers 232BA-230BM may be soldered to traces 240AA-240AM, respectively.

In one or more embodiments, transmitters 230AA-230AM may provide signals to receivers 232BA-230BM via respective traces 240AA-240AM. As shown, component 220B may include transmitters 230BA-230BM. For example, transmitters 230BA-230BM may be coupled to traces 240BA-240BM, respectively. For instance, transmitters 230BA-230BM may be soldered to traces 240BA-240BM, respectively. As illustrated, component 220A may include receivers 232AA-230AM. For example, receivers 232AA-230AM may be coupled to traces 240BA-240BM, respectively. For instance, receivers 232AA-230AM may be soldered to traces 240BA-240BM, respectively. In one or more embodiments, transmitters 230BA-230BM may provide signals to receivers 232AA-230AM via respective traces 240BA-24BM. Although FIG. 2A illustrates component 220A as including transmitters 230AA-230AM, component 220A may include any number of transmitters 230, according to one or more embodiments. Although FIG. 2A illustrates component 220A as including receivers 232AA-232AM, component 220A may include any number of receivers 232, according to one or more embodiments. Although FIG. 2A illustrates component 220B as including transmitters 230BA-230BM, component 220B may include any number of transmitters 230, according to one or more embodiments. Although FIG. 2A illustrates component 220B as including receivers 232BA-232BM, component 220B may include any number of receivers 232, according to one or more embodiments.

Figure 2B:
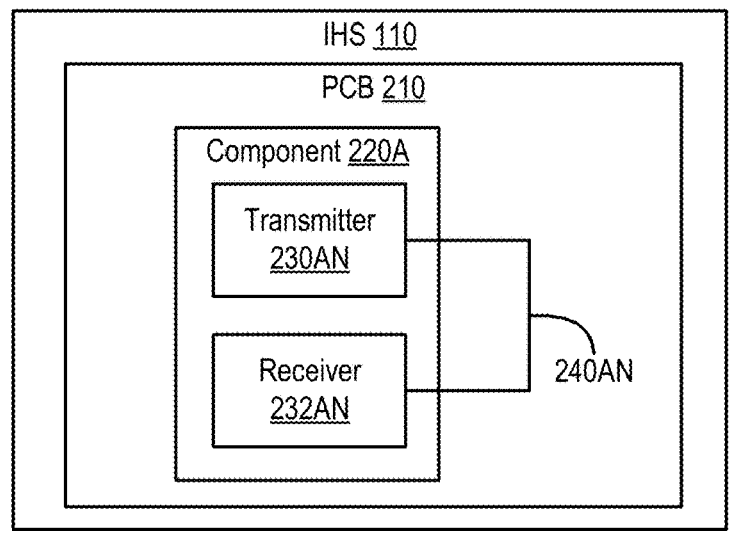
FIG. 2B illustrates an example of a component coupled to a loop trace, according to one or more embodiments.

Turning now to FIG. 2B, an example of a component coupled to a loop trace is illustrated, according to one or more embodiments. In one or more embodiments, component 220A may include a transmitter 230AN and a receiver 232AN. For example, transmitter 230AN and receiver 232AN may be coupled to a trace 240AN of PCB 210. For instance, transmitter 230AN and receiver 232AN may be soldered to trace 240AN of PCB 210. In one or more embodiments, transmitter 230AN may provide one or more signals to trace 240AN. For example, receiver 232AN may receive the one or more signals from trace 240AN.

Figure 2C:
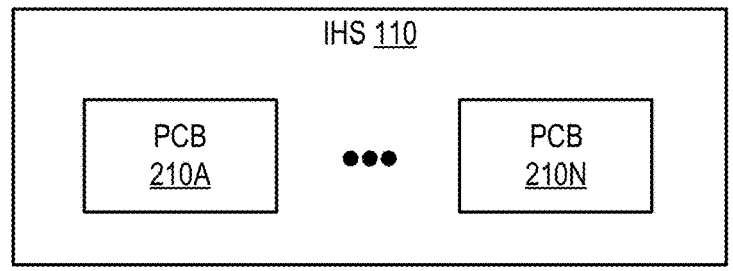
FIG. 2C illustrates an example of an information handling system that includes multiple printed circuit boards, according to one or more embodiments.

Turning now to FIG. 2C, an example of an information handling system that includes multiple printed circuit boards is illustrated, according to one or more embodiments. In one or more embodiments, an information handling system may include multiple printed circuit boards. For example, IHS 110 may include printed circuit boards (PCBs) 210A-210N. Although FIG. 2C illustrates IHS 110 as including PCBs 210A-210N, IHS 110 may include any number of PCBs 210, according to one or more embodiments.

Figure 2D:
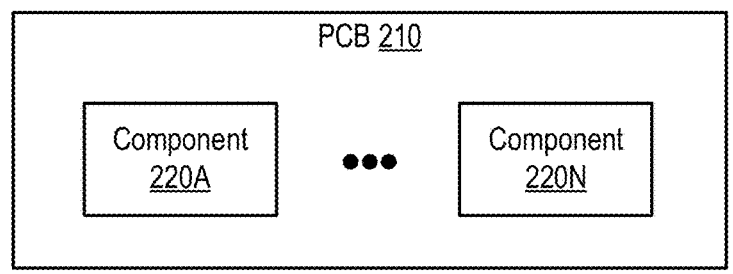
FIG. 2D illustrates an example of multiple components mounted on a printed circuit board, according to one or more embodiments.

Turning now to FIG. 2D, an example of multiple components mounted on a printed circuit board is illustrated, according to one or more embodiments. In one or more embodiments, multiple components of an information handling system may be mounted on a printed circuit board. For example, components 220A-220N of IHS 110 may be mounted on PCB 210. Although FIG. 2D illustrates components 220A-220N of IHS 110 mounted on PCB 210, any number of components 220 of IHS 110 may be mounted on PCB 210, according to one or more embodiments.

Figures 3A, 3B:
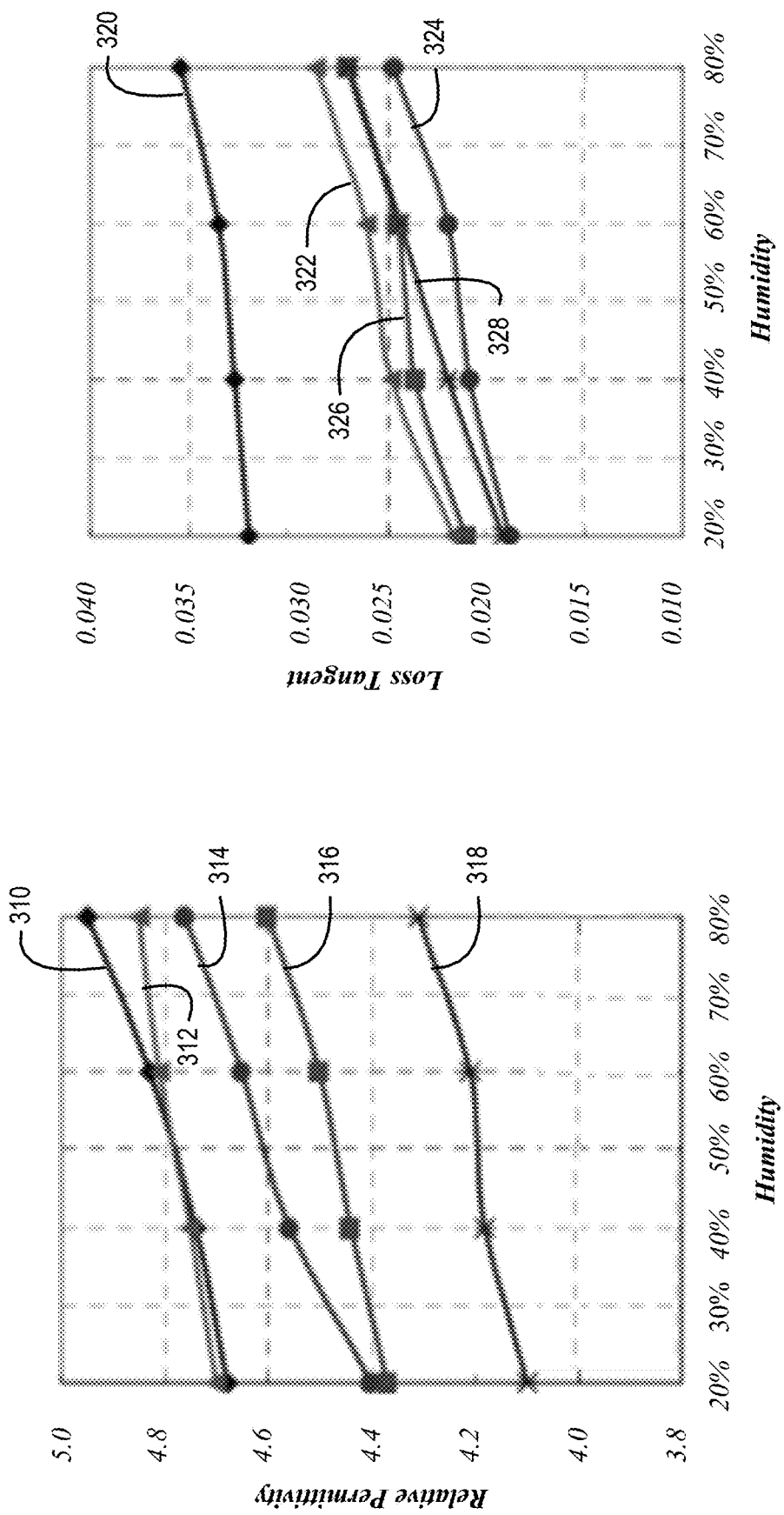
FIG. 3A illustrates example plots of relative permittivity values versus humidity percentage values, according to one or more embodiments.
FIG. 3B illustrates example plots of loss tangent values versus humidity percentage values, according to one or more embodiments.

Turning now to FIG. 3A, example plots of relative permittivity values versus humidity percentage values are illustrated, according to one or more embodiments. In one or more embodiments, a relative permittivity value associated with a printed circuit board may vary based at least on elements of the printed circuit board. For example, one or more elements of a first printed circuit board may absorb more water molecules (i.e., $H_2O$ molecules) compared to other one or more elements of a second printed circuit board. For instance, as humidity increases, absorption of water molecules (i.e., $H_2O$ molecules) over a period of time by a printed circuit board may increase. In one or more embodiments, elements of a printed circuit board that may absorb water molecules (i.e., $H_2O$ molecules) over a period of time may include one or more of an epoxy resin, a polyester resin, carbon fiber, and fiberglass, among others. In one or more embodiments, different printed circuit board manufacturers may utilize different elements to produce printed circuit boards. For example, relative permittivity values may vary based at least on the different printed circuit board manufacturers. For instance, relative permittivity values may vary based at least on different elements utilized to produce different printed circuit boards.

As one example, a plot 310 of relative permittivity values versus humidity percentage values may be associated with a first printed circuit board manufacturer. For instance, plot 310 illustrates relative permittivity values increasing as humidity percentage values increase. As a second example, a plot 312 of relative permittivity values versus humidity percentage values may be associated with a second printed circuit board manufacturer. For instance, plot 312 shows relative permittivity values increasing as humidity percentage values increase. As a third example, a plot 314 of relative permittivity values versus humidity percentage values may be associated with a third printed circuit board manufacturer. For instance, plot 314 illustrates relative permittivity values increasing as humidity percentage values increase. As a fourth example, a plot 316 of relative permittivity values versus humidity percentage values may be associated with a fourth printed circuit board manufacturer. For instance, plot 316 shows relative permittivity values increasing as humidity percentage values increase. As a fifth example, a plot 318 of relative permittivity values versus humidity percentage values may be associated with a fifth printed circuit board manufacturer. For instance, plot 318 illustrates relative permittivity values increasing as humidity percentage values increase.

Turning now to FIG. 3B, example plots of loss tangent values versus humidity percentage values are illustrated, according to one or more embodiments. In one or more embodiments, a loss tangent value associated with a printed circuit board may vary based at least on elements of the printed circuit board. For example, one or more elements of a first printed circuit board may absorb more water molecules (i.e., $H_2O$ molecules) compared to other one or more elements of a second printed circuit board. For instance, as humidity increases, absorption of water molecules (i.e., $H_2O$ molecules) over a period of time by a printed circuit board may increase. In one or more embodiments, elements of a printed circuit board that may absorb water molecules (i.e., H₂O molecules) over a period of time may include one or more of an epoxy resin, a polyester resin, carbon fiber, and fiberglass, among others. In one or more embodiments, different printed circuit board manufacturers may utilize different elements to produce printed circuit boards. For example, loss tangent values may vary based at least on the different printed circuit board manufacturers. For instance, loss tangent values may vary based at least on different elements utilized to produce different printed circuit boards.

As one example, a plot 320 of loss tangent values versus humidity percentage values may be associated with the first printed circuit board manufacturer. For instance, plot 320 illustrates loss tangent values increasing as humidity percentage values increase. As a second example, a plot 322 of loss tangent values versus humidity percentage values may be associated with the second printed circuit board manufacturer. For instance, plot 322 shows loss tangent values increasing as humidity percentage values increase. As a third example, a plot 324 of loss tangent values versus humidity percentage values may be associated with the third printed circuit board manufacturer. For instance, plot 324 illustrates loss tangent values increasing as humidity percentage values increase. As a fourth example, a plot 326 of loss tangent values versus humidity percentage values may be associated with the fourth printed circuit board manufacturer. For instance, plot 326 shows loss tangent values increasing as humidity percentage values increase. As a fifth example, a plot 328 of loss tangent values versus humidity percentage values may be associated with the fifth printed circuit board manufacturer. For instance, plot 328 illustrates loss tangent values increasing as humidity percentage values increase.

Figure 4A:
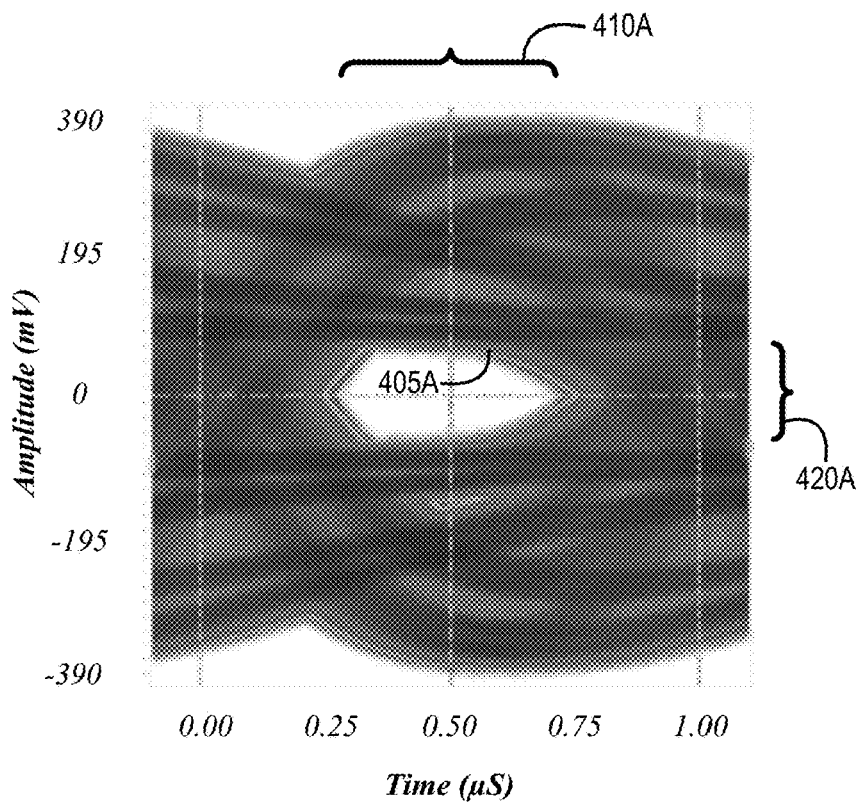
FIGS. 4A-4E illustrate examples of eye diagrams associated with signals, according to one or more embodiments.
Figure 4B:
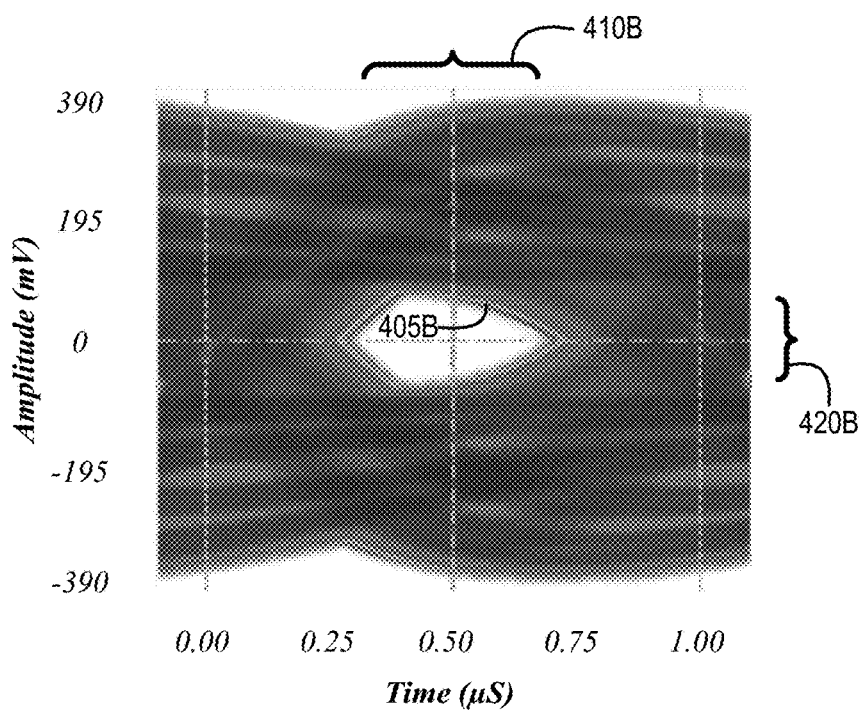

Turning now to FIGS. 4A-4E, examples of eye diagrams associated with signals are illustrated, according to one or more embodiments. In one or more embodiments, an eye diagram 405 associated with a signal carried by a trace of a printed circuit board may be associated with a width 410 and a height 420. In one example, an eye diagram 405A associated with a first signal carried by a trace 240 of PCB 210 may be associated with a width 410A and a height 420A, as shown in FIG. 4A. In another example, an eye diagram 405B associated with a second signal carried by trace 240 of PCB 210 may be associated with a width 410B and a height 420B, as illustrated in FIG. 4B. In one instance, width 410B may be less than width 410A. In another instance, height 420B may be less than height 420A.

In one or more embodiments, width 410B and/or height 420B may be determined after an amount of time has transpired subsequent to respectively determining width 410A and/or height 420A. In one example, width 410A may be determined at a first time, and width 410B may be determined at a second time, after the first time. In another example, height 420A may be determined at the first time, and height 420B may be determined at the second time. In one or more embodiments, one or more of a width 410 and a height 420 of an eye diagram 405 may be reduced as a relative permittivity value associated with a printed circuit board or a loss tangent value associated with the printed circuit board increases. For example, when PCB 210 is exposed to increasing humidity, a relative permittivity value associated with PCB 210 or a loss tangent value associated with PCB 210 may increase.

In one or more embodiments, it may be determined that width 410B is less than width 410A. For example, when it is determined that width 410B is less than width 410A, it may be determined that a relative permittivity value associated with PCB 210 or a loss tangent value associated with PCB 210 has increased. For instance, when it is determined that the relative permittivity value associated with PCB 210 or the loss tangent value associated with PCB 210 has increased, it may be determined that a humidity percentage value to which PCB 210 is exposed has increased. In one or more embodiments, it may be determined that height 420B is less than height 420A. For example, when it is determined that height 420B is less than height 420A, it may be determined that a relative permittivity value associated with PCB 210 or a loss tangent value associated with PCB 210 has increased. For instance, when it is determined that the relative permittivity value associated with PCB 210 or the loss tangent value associated with PCB 210 has increased, it may be determined that a humidity percentage value to which PCB 210 is exposed has increased. In one or more embodiments, eye diagram 405 may be determined via a receiver 232. In one example, width 410 of eye diagram 405 may be determined (e.g., measured) via a receiver 232. In another example, height 420 of eye diagram 405 may be determined (e.g., measured) via a receiver 232.

Figure 4D:
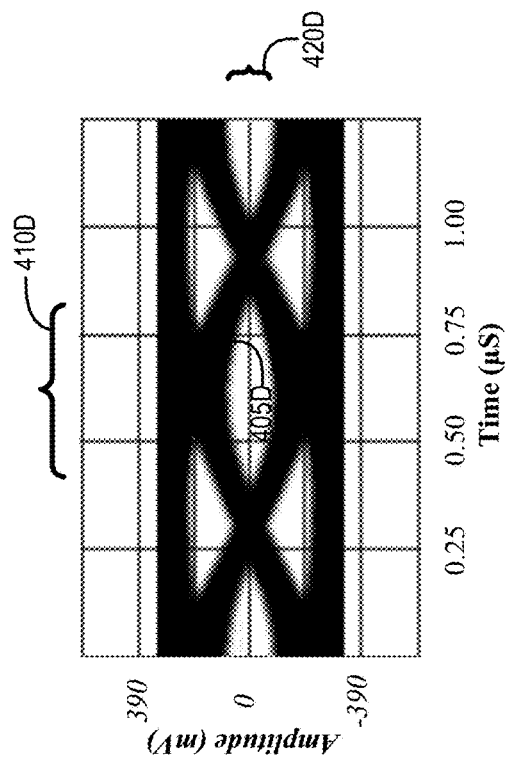
Figure 4C:
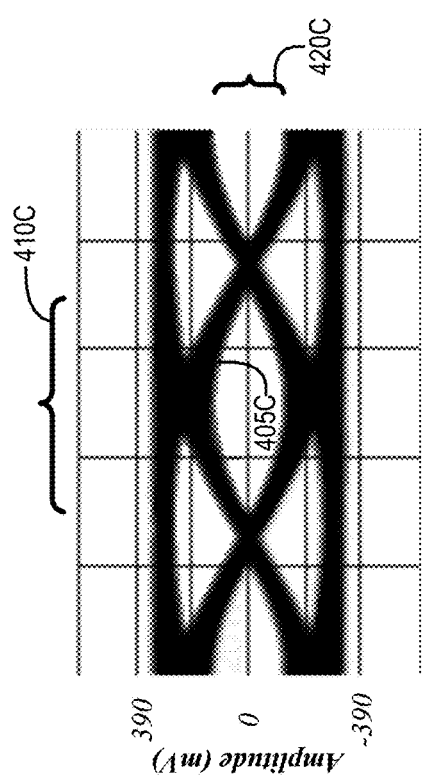

In one or more embodiments, an eye diagram 405C, illustrated in FIG. 4C, and an eye diagram 405D, shown in FIG. 4D, may be associated with a first signal carried by a trace 240 of PCB 210. In one example, a receiver 232 may determine width 410C and/or height 420C associated with eye diagram 405C. In another example, a receiver 232 may determine width 410D and/or height 420D associated with eye diagram 405D. In one or more embodiments, an eye diagram 405D, illustrated in FIG. 4D, and an eye diagram 405E, shown in FIG. 4E, may be associated with a second signal carried by a trace 240 of PCB 210. In one example, a receiver 232 may determine width 410D and/or height 420D associated with eye diagram 405D. In another example, a receiver 232 may determine width 410E and/or height 420E associated with eye diagram 405E. As an example, width 410C may be greater than width 410D. As a second example, width 410D may be greater than width 410E. As a third example, height 420C may be greater than height 420D. As another example, height 420D may be greater than height 420E.

Figure 4E:
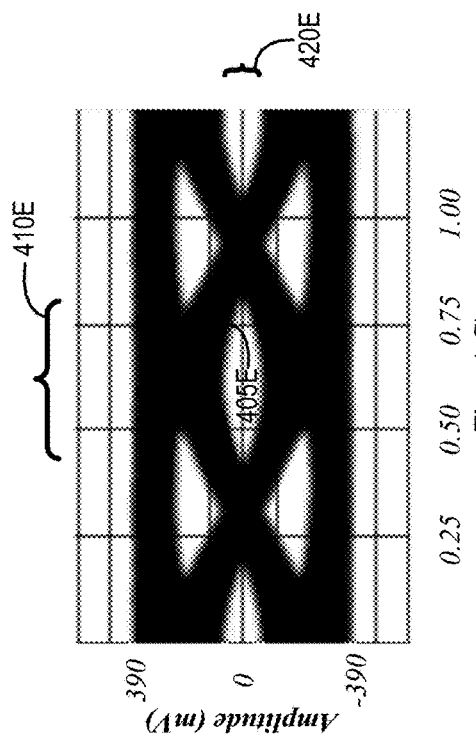

In one or more embodiments, eye diagram 405C, illustrated in FIG. 4C, may be associated with a first signal carried by a trace 240 of PCB 210; eye diagram 405D, illustrated in FIG. 4D, may be associated with a second signal carried by trace 240 of PCB 210; and eye diagram 405E, illustrated in FIG. 4E, may be associated with a third signal carried by trace 240 of PCB 210. For example, eye diagram 405C may be determined at a first time; eye diagram 405D may be determined at a second time, after the first time; and eye diagram 405E may be determined at a third time, after the second time. For instance, one or more of width 410C and height 420C may be determined (e.g., measured) at the first time; one or more of width 410D and height 420D may be determined (e.g., measured) at the second time, after the first time; and one or more of width 410E and height 420E may be determined (e.g., measured) at the third time, after the second time. In one or more embodiments, a first amount of time may transpire between the first time and the second time, and/or a second amount of time may transpire between the second time and the third time.

Figure 4F:
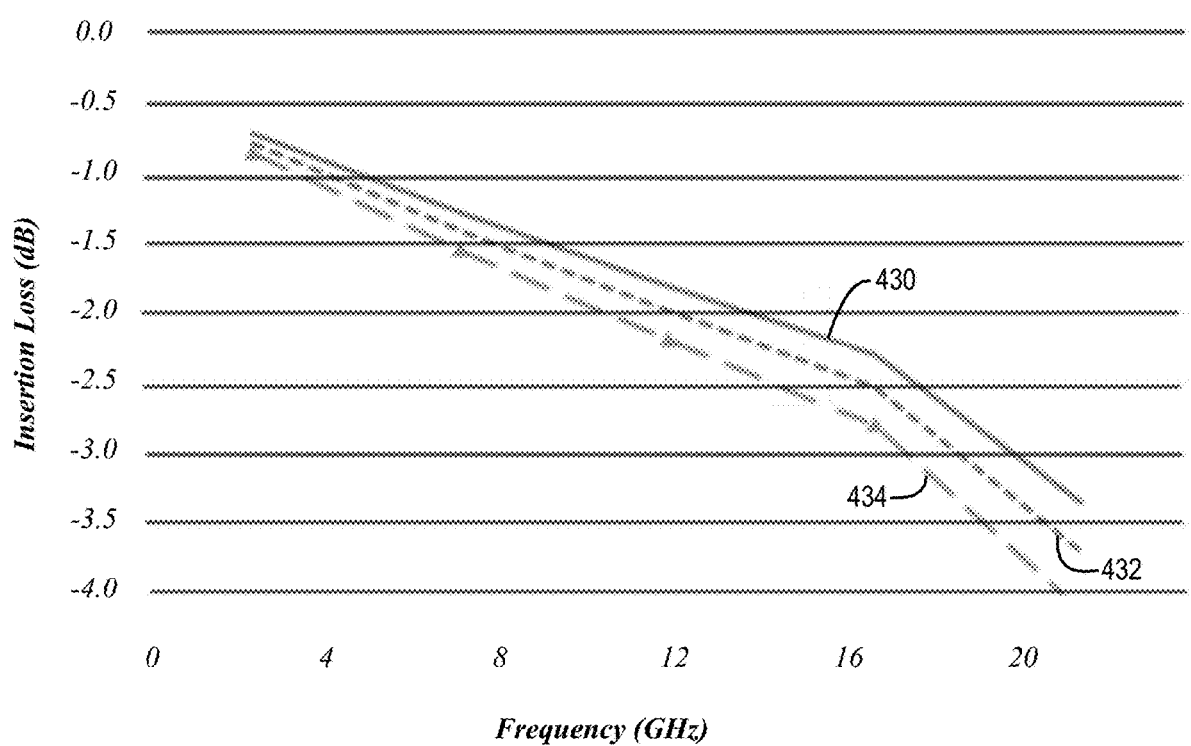
FIG. 4F illustrates example plots of insertion loss values versus frequency of a printed circuit board exposed to different humidity percentage values, according to one or more embodiments.

Turning now to FIG. 4F, example plots of insertion loss values versus frequency of a printed circuit board exposed to different humidity percentage values are illustrated, according to one or more embodiments. In one example, a plot 430 may be associated with signals carried by a trace 240 of PCB 210 when PCB 210 is exposed to a humidity percentage value of 20%. In a second example, a plot 432 may be associated with signals carried by a trace 240 of PCB 210 when PCB 210 is exposed to a humidity percentage value of 50%. In another example, a plot 434 may be associated with signals carried by a trace 240 of PCB 210 when PCB 210 is exposed to a humidity percentage value of 70%. As illustrated, decibel (dB) insertion loss values associated with plots 430-434 may decrease as humidity percentage values increase.

Figure 5:
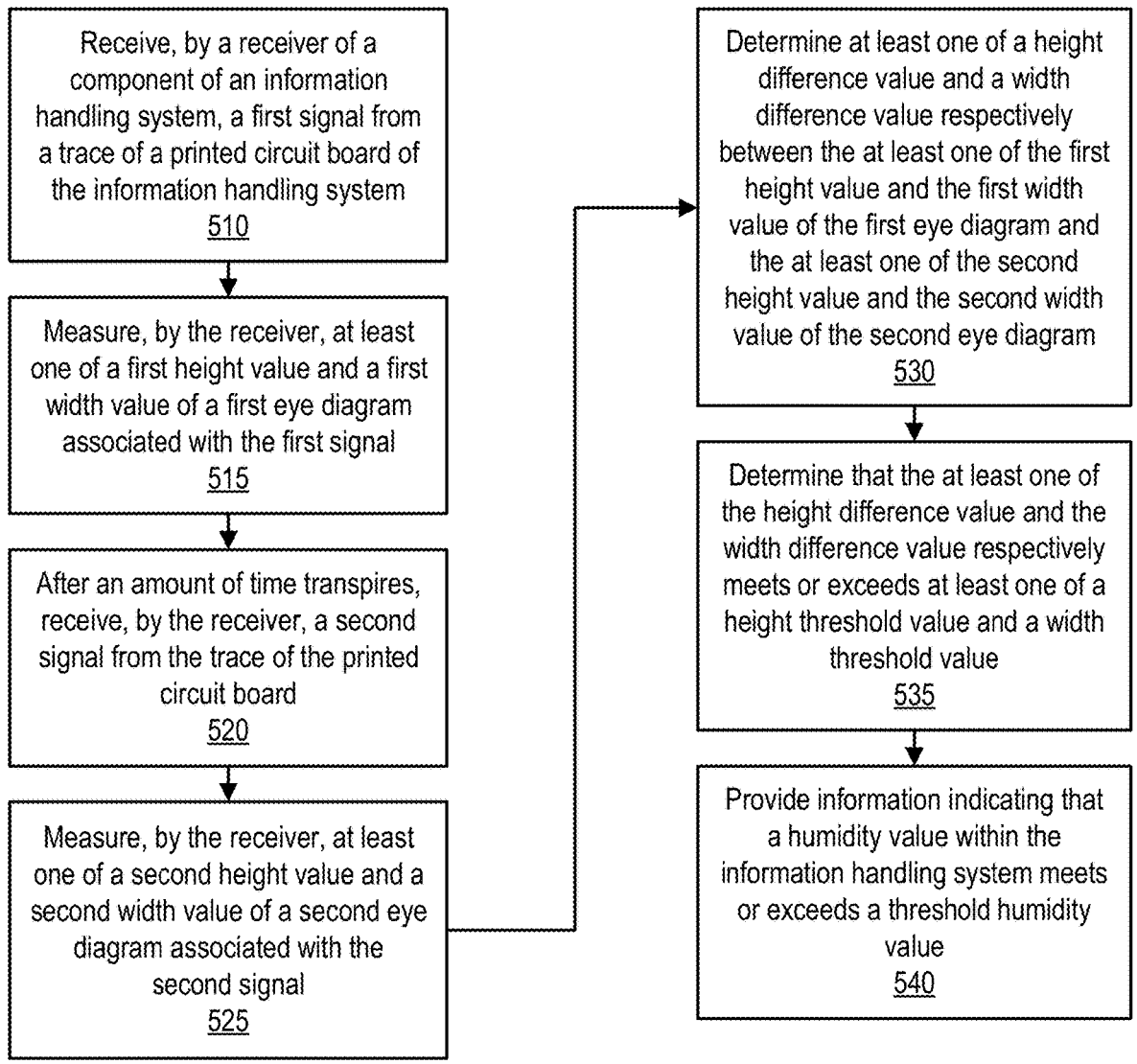
FIG. 5 illustrates an example of a method of detecting a change in humidity within an information handling system, according to one or more embodiments.

Turning now to FIG. 5, an example of a method of detecting a change in humidity within an information handling system is illustrated, according to one or more embodiments. At 510, a receiver of a component of an information handling system may receive a first signal from a trace of a printed circuit board of the information handling system. In one example, receiver 232BA of component 220B of IHS 110 may receive a first signal from trace 240AA of PCB 210 of IHS 110, as shown in FIG. 2A. In a second example, receiver 232AA of component 220A of IHS 110 may receive a first signal from trace 240BA of PCB 210 of IHS 110, as illustrated in FIG. 2A. In another example, receiver 232AN of component 220A of IHS 110 may receive a first signal from trace 240AN of PCB 210 of IHS 110, as shown in FIG. 2B.

At 515, the receiver may measure at least one of a first height value and a first width value of a first eye diagram associated with the first signal. For example, receiver 232BA, receiver 232AA, or receiver 232AN may measure at least one of a first height value and a first width value of a first eye diagram associated with the first signal. In one instance, the first eye diagram associated with the first signal may be eye diagram 405A, illustrated in FIG. 4A. In a second instance, the first eye diagram associated with the first signal may be eye diagram 405C, shown in FIG. 4C. In another instance, the first eye diagram associated with the first signal may be eye diagram 405D, illustrated in FIG. 4D.

In one or more embodiments, a receiver 232 may include an eye detector. For example, the eye detector may measure the at least one of the first height value and the first width value of the first eye diagram associated with the first signal. For instance, the eye detector may include one or more analog to digital signal converters. As an example, the one or more analog to digital signal converters of the eye detector may measure the at least one of the first height value and the first width value of the first eye diagram associated with the first signal. In one or more embodiments, the eye detector may be configured to implement at least a portion of one or more systems, at least a portion of one or more flowcharts, at least a portion of one or more methods, and/or at least a portion of one or more processes described herein.

At 520, the receiver may receive a second signal from the trace of the printed circuit board after an amount of time transpires. In one example, receiver 232BA of component 220B of IHS 110 may receive a second signal from trace 240AA of PCB 210 of IHS 110, as shown in FIG. 2A, after an amount of time transpires. In a second example, receiver 232AA of component 220A of IHS 110 may receive a second signal from trace 240BA of PCB 210 of IHS 110, as illustrated in FIG. 2A, after an amount of time transpires. In another example, receiver 232AN of component 220A of IHS 110 may receive a second signal from trace 240AN of PCB 210 of IHS 110, as shown in FIG. 2B, after an amount of time transpires. As an example, the amount of time may be at least a day. As a second example, the amount of time may be at least a week. As a third example, the amount of time may be at least two weeks. As a fourth example, the amount of time may be at least four weeks. As another example, the amount of time may be at least a month. In one or more embodiments, the amount of time may be any amount of time long enough for an increase humidity level to measurably affect a relative permittivity associated with a printed circuit board or a loss tangent associated with the printed circuit board. For example, the amount of time may be any amount of time long enough for a relative permittivity associated with a printed circuit board or a loss tangent associated with the printed circuit board to be measurably detected, by one or more methods, one or more processes, and/or one or more systems described herein, when there is a possible increase or an actual increase in a humidity value surrounding the printed circuit board.

At 525, the receiver may measure at least one of a second height value and a second width value of a second eye diagram associated with the second signal. For example, receiver 232BA, receiver 232AA, or receiver 232AN may measure at least one of a second height value and a second width value of a second eye diagram associated with the second signal. In one instance, the second eye diagram associated with the second signal may be eye diagram 405B, shown in FIG. 4B. In a second instance, the second eye diagram associated with the second signal may be eye diagram 405D, illustrated in FIG. 4D. In another instance, the second eye diagram associated with the second signal may be eye diagram 405E, shown in FIG. 4E. In one or more embodiments, the eye detector of a receiver 232 detector may measure the at least one of the second height value and the second width value of the second eye diagram associated with the second signal. For example, the one or more analog to digital signal converters of the eye detector may measure the at least one of the second height value and the second width value of the second eye diagram associated with the second signal.

At 530, at least one of a height difference value and a width difference value may be respectively determined between the at least one of the first height value and the first width value of the first eye diagram and the at least one of the second height value and the second width value of the second eye diagram. For example, receiver 232BA, receiver 232AA, or receiver 232AN may determine at least one of a height difference value and a width difference value respectively between the at least one of the first height value and the first width value of the first eye diagram and the at least one of the second height value and the second width value of the second eye diagram. For instance, the eye detector of a receiver 232 detector may determine the at least one of the height difference value and the width difference value respectively between the at least one of the first height value and the first width value of the first eye diagram and the at least one of the second height value and the second width value of the second eye diagram. As an example, the one or more analog to digital signal converters of the eye detector may determine the at least one of the height difference value and the width difference value respectively between the at least one of the first height value and the first width value of the first eye diagram and the at least one of the second height value and the second width value of the second eye diagram.

At 535, it may be determined that the at least one of the height difference value and the width difference value respectively meets or exceeds at least one of a height threshold value and a width threshold value. For example, receiver 232BA, receiver 232AA, or receiver 232AN may determine that the at least one of the height difference value and the width difference value respectively meets or exceeds at least one of a height threshold value and a width threshold value. For instance, the eye detector of a receiver 232 detector may determine that the at least one of the height difference value and the width difference value respectively meets or exceeds the at least one of the height threshold value and the width threshold value. As an example, the one or more analog to digital signal converters of the eye detector may determine that the at least one of the height difference value and the width difference value respectively meets or exceeds the at least one of the height threshold value and the width threshold value.

At 540, information indicating that a humidity value within the information handling system meets or exceeds a threshold humidity value may be provided. For example, receiver 232BA, receiver 232AA, or receiver 232AN may provide information indicating that a humidity value within the information handling system meets or exceeds a threshold humidity value. For instance, receiver 232BA, receiver 232AA, or receiver 232AN may provide, to processor 120, the information indicating that the humidity value within the information handling system meets or exceeds the threshold humidity value. In one or more embodiments, processor 120 may provide an alert to an administrator that the humidity value within the information handling system meets or exceeds the threshold humidity value. For example, processor 120 may provide, to an administrator information handling system associated with the administrator, the alert that the humidity value within the information handling system meets or exceeds the threshold humidity value. For instance, the administrator may be an administrator of a datacenter. In one or more embodiments, receiver 232BA, receiver 232AA, or receiver 232AN may provide the alert to the administrator that the humidity value within the information handling system meets or exceeds the threshold humidity value via one or more of processor 120 and an administrator information handling system, among others. In one or more embodiments, providing information indicating that a humidity value within the information handling system meets or exceeds a threshold humidity value may be performed in response to determining that the at least one of the height difference value and the width difference value respectively meets or exceeds the at least one of the height threshold value and the width threshold value.

In one or more embodiments, a transmitter may transmit the first signal to the trace of the printed circuit board of the information handling system. In one example, transmitter 230AA of component 220A of IHS 110 may transmit the first signal to trace 240AA of PCB 210 of IHS 110, as shown in FIG. 2A. In a second example, transmitter 230BA of component 220B of IHS 110 may transmit the first signal to trace 240BA of PCB 210 of IHS 110, as illustrated in FIG. 2A. In another example, transmitter 230AN of component 220A of IHS 110 may transmit the first signal to trace 240AN of PCB 210 of IHS 110, as shown in FIG. 2B. In one or more embodiments, the transmitter may transmit the second signal to the trace of the printed circuit board of the information handling system. In one example, transmitter 230AA of component 220A of IHS 110 may transmit the second signal to trace 240AA of PCB 210 of IHS 110, as shown in FIG. 2A. In a second example, transmitter 230BA of component 220B of IHS 110 may transmit the second signal to trace 240BA of PCB 210 of IHS 110, as illustrated in FIG. 2A. In another example, transmitter 230AN of component 220A of IHS 110 may transmit the second signal to trace 240AN of PCB 210 of IHS 110, as shown in FIG. 2B.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a printed circuit board; and
a component of the information handling system mounted on the printed circuit board;
wherein a receiver of the component is configured to:
receive a first signal from a trace of the printed circuit board of the information handling system;
wherein the receiver includes one or more analog to digital converters that are configured to:
measure at least one of a first height value and a first width value of a first eye diagram associated with the first signal;
wherein the receiver is further configured to:
after an amount of time transpires, receive a second signal from the trace of the printed circuit board;
wherein the one or more analog to digital converters are further configured to:
measure at least one of a second height value and a second width value of a second eye diagram associated with the second signal;
determine at least one of a height difference value and a width difference value respectively between the at least one of the first height value and the first width value of the first eye diagram and the at least one of the second height value and the second width value of the second eye diagram; and
determine that the at least one of the height difference value and the width difference value respectively meets or exceeds at least one of a height threshold value and a width threshold value; and
wherein the receiver is further configured to:
in response to determining that the at least one of the height difference value and the width difference value respectively meets or exceeds the at least one of the height threshold value and the width threshold value, provide information indicating that a humidity value within the information handling system meets or exceeds a threshold humidity value.

2. The information handling system of claim 1, wherein the amount of time is at least one day.

3. The information handling system of claim 1,
wherein the receiver includes an eye detector that includes the one or more analog to digital converters; and
wherein, to determine the at least one of the height difference value and the width difference value respectively between the at least one of the first height value and the first width value of the first eye diagram and the at least one of the second height value and the second width value of the second eye diagram, the eye detector is configured to determine the at least one of the height difference value and the width difference value respectively between the at least one of the first height value and the first width value of the first eye diagram and the at least one of the second height value and the second width value of the second eye diagram.

4. The information handling system of claim 1, wherein a transmitter of the component is configured to:
transmit the first signal to the trace of the printed circuit board; and
transmit the second signal to the trace of the printed circuit board.

5. The information handling system of claim 1, wherein the component is soldered to the printed circuit board.

6. The information handling system of claim 1, wherein, to provide the information indicating that the humidity value within the information handling system meets or exceeds the threshold humidity value, the receiver is further configured to provide an alert to an administrator that the humidity value within the information handling system meets or exceeds the threshold humidity value.

7. The information handling system of claim 1,
wherein, to receive the first signal from the trace of the printed circuit board, the receiver is further configured to receive the first signal from the trace of the printed circuit board from another component of the information handling system, different from the component; and
wherein, to receive the second signal from the trace of the printed circuit board, the receiver is further configured to receive the second signal from the trace of the printed circuit board from the other component of the information handling system.

8. A method, comprising:
receiving, by a receiver of a component of an information handling system, a first signal from a trace of a printed circuit board of the information handling system;
measuring, by one or more analog to digital converters of the receiver, at least one of a first height value and a first width value of a first eye diagram associated with the first signal;
after an amount of time transpires, receiving, by the receiver, a second signal from the trace of the printed circuit board;
measuring, by the one or more analog to digital converters of the receiver, at least one of a second height value and a second width value of a second eye diagram associated with the second signal;
determining, by the one or more analog to digital converters of the receiver, at least one of a height difference value and a width difference value respectively between the at least one of the first height value and the first width value of the first eye diagram and the at least one of the second height value and the second width value of the second eye diagram;
determining, by the one or more analog to digital converters of the receiver, that the at least one of the height difference value and the width difference value respectively meets or exceeds at least one of a height threshold value and a width threshold value; and
in response to the determining that the at least one of the height difference value and the width difference value respectively meets or exceeds the at least one of the height threshold value and the width threshold value, providing information indicating that a humidity value within the information handling system meets or exceeds a threshold humidity value.

9. The method of claim 8, wherein the amount of time is at least one day.

10. The method of claim 8, further comprising:
transmitting, by a transmitter of the component, the first signal to the trace of the printed circuit board; and
transmitting, by the transmitter, the second signal to the trace of the printed circuit board.

11. The method of claim 8, wherein the component is soldered to the printed circuit board.

12. The method of claim 8, wherein the providing the information indicating that the humidity value within the information handling system meets or exceeds the threshold humidity value includes providing an alert to an administrator that the humidity value within the information handling system meets or exceeds the threshold humidity value.

13. The method of claim 8,
wherein the receiving, by the receiver, the first signal from the trace of the printed circuit board includes receiving, by the receiver, the first signal from the trace of the printed circuit board from another component of the information handling system, different from the component; and
wherein the receiving, by the receiver, the second signal from the trace of the printed circuit board includes receiving, by the receiver, the second signal from the trace of the printed circuit board from the other component of the information handling system.

14. A component of an information handling system, comprising:
a receiver;
wherein the receiver includes one or more analog to digital converters;
wherein the receiver is configured to be mounted on a printed circuit board of the information handling system and is configured to:
receive a first signal from a trace of the printed circuit board of the information handling system;
wherein the one or more analog to digital converters are configured to:
measure at least one of a first height value and a first width value of a first eye diagram associated with the first signal;
wherein the receiver is further configured to:
after an amount of time transpires, receive a second signal from the trace of the printed circuit board;
wherein the one or more analog to digital converters are configured to:
measure at least one of a second height value and a second width value of a second eye diagram associated with the second signal;
determine at least one of a height difference value and a width difference value respectively between the at least one of the first height value and the first width value of the first eye diagram and the at least one of the second height value and the second width value of the second eye diagram; and
determine that the at least one of the height difference value and the width difference value respectively meets or exceeds at least one of a height threshold value and a width threshold value; and wherein the receiver is further configured to:
in response to determining that the at least one of the height difference value and the width difference value respectively meets or exceeds the at least one of the height threshold value and the width threshold value, provide information indicating that a humidity value within the information handling system meets or exceeds a threshold humidity value.

15. The component of claim 14, wherein the amount of time is at least one day.

16. The component of claim 14,
wherein the receiver includes an eye detector that includes the one or more analog to digital converters; and
wherein, to determine the at least one of the height difference value and the width difference value respectively between the at least one of the first height value and the first width value of the first eye diagram and the at least one of the second height value and the second width value of the second eye diagram, the eye detector is configured to determine the at least one of the height difference value and the width difference value respectively between the at least one of the first height value and the first width value of the first eye diagram and the at least one of the second height value and the second width value of the second eye diagram.

17. The component of claim 14, further comprising:
a transmitter;
wherein the transmitter is configured to:
transmit the first signal to the trace of the printed circuit board; and
transmit the second signal to the trace of the printed circuit board.

18. The component of claim 14, wherein, to provide the information indicating that the humidity value within the information handling system meets or exceeds the threshold humidity value, the receiver is further configured to provide an alert to an administrator that the humidity value within the information handling system meets or exceeds the threshold humidity value.

19. The component of claim 14,
wherein, to receive the first signal from the trace of the printed circuit board, the receiver is further configured to receive the first signal from the trace of the printed circuit board from another component of the information handling system, different from the component; and
wherein, to receive the second signal from the trace of the printed circuit board, the receiver is further configured to receive the second signal from the trace of the printed circuit board from the other component of the information handling system.

* * * * *